United States Patent Office 2,731,504
Patented Jan. 17, 1956

2,731,504

PRODUCTION OF ALIPHATIC ALCOHOLS FROM OLEFINS

Walter Reppe, Ludwigshafen (Rhine), Nikolaus v. Kutepow, Karlsruhe-Rueppurr, and Manfred Heintzeler, Ludwigshafen (Rhine), Germany, assignors to Badische Anilin- & Soda-Fabrik Aktiengesellschaft, Ludwigshafen am Rhine, Germany No Drawing. Application April 16, 1952,
Serial No. 282,688

Claims priority, application Germany May 2, 1951

9 Claims. (Cl. 260—638)

The present invention relates to the production of aliphatic alcohols, in particular to the synthesis of such alcohols by a carbonylation of olefinic hydrocarbons in the presence of water.

It is known that alcohols may be produced by the reaction of olefins with carbon monoxide and water in the presence of alkaline compounds and metal carbonyls or metal carbonyl hydrides or the salts thereof. The alcohols thus formed contain one carbon atom more than the olefin introduced into the reaction (see Walter Reppe, Experentia, 1949, pp. 93-110).

It is an object of the present invention to provide an improvement of this carbonylation process. It is another object of our invention to carry out this process under less energetic conditions and with better yields than it was hitherto possible. Further objects of our invention will be seen from the following description:

We have found that aliphatic alcohols may be obtained by heating to elevated temperatures and under increased pressure in an aqueous from neutral to alkaline reaction medium an olefinic hydrocarbon with a soluble salt of formic acid in the presence of a metal carbonyl. This metal carbonyl may be introduced into the reaction mixture either as such or in form of the corresponding metal carbonyl hydride or in form of a salt of this metal carbonyl hydride soluble in water. When introducing the metal carbonyl or its hydride as such, it will most probably be converted into the corresponding salt in situ.

The process may be defined according to the following equation, given by way of example:

1. 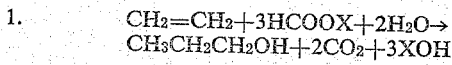
$$CH_2=CH_2 + 3HCOOX + 2H_2O \rightarrow CH_3CH_2CH_2OH + 2CO_2 + 3XOH$$

wherein X stands for the metal or basic radical used in the formation of the formic acid salt. The action of the metal carbonyl hydride is not considered in this equation.

The following equation illustrates the known reaction of an olefin with carbon monoxide as such, as it has been described, for example, in the paper by Walter Reppe referred to above:

2. 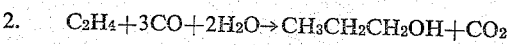
$$C_2H_4 + 3CO + 2H_2O \rightarrow CH_3CH_2CH_2OH + CO_2$$

It will be seen that the invention makes it possible to replace the carbon monoxide by salts of formic acid in the ratio of 1 to 1. The process characterized by Equation 1 above may be modified by fulfilling the CO-requirements of the reaction not entirely by offering a formic acid salt but by using both carbon monoxide and a formic acid salt. Such a modification of our invention is characterized by Equation 3:

3. 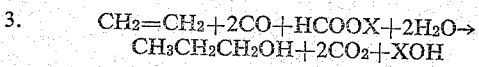
$$CH_2=CH_2 + 2CO + HCOOX + 2H_2O \rightarrow CH_3CH_2CH_2OH + 2CO_2 + XOH$$

To carry out our invention in practice we prefer to work in the liquid phase by heating an aqueous solution of a soluble formic acid salt, admixed with a metal carbonyl, preferably an iron carbonyl. In general, temperatures between 80° and 200° C. are sufficient, though we may use higher temperatures to speed up the reaction even more. The preferred range of our process is between 100° and 200° C. The pressure used preferably exceeds 50 atmospheres. Generally, we work under 100 to 350 atmospheres or under even higher pressures if the necessary equipment is available.

The reaction of the aqueous medium should be from neutral to alkaline. Consequently, we prefer to use salts of formic acid with alkali or alkaline earth metals and, preferably, salts of nitrogen bases. We have found that the most suitable salts are those derived from tertiary amino compounds. The salts derived from tertiary aliphatic amines, i. e. amines having no aromatic radicals, are very suitable. As examples we cite trimethyl amine, diethyl ethanol amine and N-propyl pyrrolidine and the alkali metal salts of dialkyl diamine carboxylic acids. Mixtures of such nitrogen bases may be used for the formation of the formic acid salts. We prefer to produce these salts in situ by adding both the formic acid and the base to the reaction medium. An excess of the base does not hurt the performance of the reaction.

It is possible to carry out our process by using exclusively a formic acid salt as the provider of carbon monoxide. However, we prefer to carry out the reaction while pressing in carbon monoxide, even if a sufficient amount of the formic acid salt is available for the alcohol formation. When starting with normally gaseous olefins, such as ethylene or propylene, these gases are usually pressed into the reaction liquid in admixture with an equal amount by volume of an excess of carbon monoxide.

Besides ethylene and propylene, we may also use other aliphatic olefins, such as n- and iso-butylene or octylene, cyclic olefins, such as cyclohexene, octahydronaphthaline or terpenes. When starting from diolefins, such as butadiene, isoprene, piperylene, 2.3-dimethyl butadiene or hexadienes, only one double linkage is undergoing the reaction with carbon monoxide and water, as a rule, whereas the second double linkage is hydrogenated.

We prefer to use iron penta-carbonyl as the metal carbonyl. This carbonyl should be found unchanged at the end of the reaction, provided that the reaction is carried out smoothly. The iron carbonyl, however, will be decomposed under the formation of ferrous carbonate if there is not enough formic acid salt or carbon monoxide to supply the demand from the olefin. In this case the carbon monoxide requirements will be covered from the iron carbonyl. In the absence of carbon monoxide or a formic acid salt propanol would be formed in stoichiometric conversion from ethylene, water and iron carbonyl.

As indicated by the above equations, alcohols are formed containing one carbon atom more than the olefin. When starting from α-olefins, the reaction leads substantially to alcohols of straight chain composition. The formation of isomers, homologues or other reaction products has not been observed at all or only to a small extent. When working in the absence of carbon monoxide, while using exclusively the formic acid salt as the carbon monoxide spender, 2-methyl-pentanol-1 is obtained in addition to n-propanol from the conversion of ethylene.

When using tertiary amines as the basis of the formic acid salt, there may be an exchange of alkyl groups between this amine and the alcohol formed. Thus propanol, prepared from ethylene in the absence of the formic acid salt of triethyl amine, may contain ethanol, while simultaneously corresponding amounts of diethyl propyl amine, ethyl dipropyl amine and tripropyl amine are formed.

The process according to our invention may be carried out either batchwise or continuously. When working continuously and in the presence of carbon monoxide, we prefer to use the latter as a circulating gas, while removing from time to time or continuously the carbon dioxide formed, for example by scrubbing with water under pressure. The alcohol formed may also be removed either from the liquid phase or from the circulating gas continuously. By maintaining a sufficient level of carbon monoxide in the circulating gas and by keeping the carbon dioxide level low enough, the continuous process may be carried out for a long time without decomposition of the iron carbonyl or the iron carbonyl hydride, respectively, to ferrous carbonate.

The following examples will further illustrate how our invention may be carried out in practice. Obvious changes in the starting materials and the reaction conditions may be made in these examples without principle change of our invention.

Example 1

A mixture of 500 grams of triethyl amine with 850 grams of ground ice are neutralized with formic acid. The salt solution thus obtained is admixed with 150 grams of iron penta-carbonyl and given into a stirring autoclave made from stainless steel, having a volume of 5 litres. After having removed the air with nitrogen, a mixture of 1 part by volume of ethylene and 2 parts by volume of carbon monoxide under 150 atmospheres are pressed in at normal temperature. The autoclave is then heated to 130° C., while maintaining a pressure of 200 atmospheres by replenishing the ethylene-carbon monoxide mixture until it is no longer absorbed. This takes about 40 hours. The autoclave is allowed to cool, the pressure is released and the iron carbonyl separated off.

The aqueous reaction product is then acidified with sulfuric acid and distilled. As the main fraction an azeotropic propanol-water mixture, boiling at 87° C. is obtained. The propanol is salted out with anhydrous potash and again distilled. The yield amounts to 238 grams of pure propanol (B. P.=96°–97° C.).

Example 2

In a stainless steel autoclave of 5 litres a mixture of 1 part of ethylene and 3 parts of carbon monoxide under 150 atmospheres pressure are pressed into a mixture of 170 grams of N-propyl pyrrolidine, 500 grams of water, 69 grams of formic acid and 100 grams of iron carbonyl at normal temperature. The reaction is then carried out in the manner described in Example 1. The yield amounts to 420 grams of pure propanol.

Example 3

A mixture of 170 grams of N-propyl pyrrolidine, 120 grams of pyridine, 600 grams of water, 138 grams of formic acid and 100 grams of iron carbonyl are treated in the manner described in Example 1 with a mixture of equal parts by volume of ethylene and carbon monoxide. The yield amounts to 240 grams of propanol.

Example 4

An autoclave of 5 litres is charged with 267 grams of dimethyl monoethanol amine, 600 grams of water, 138 grams of formic acid and 150 grams of iron carbonyl. After replacing the air by nitrogen, ethylene is pressed in under 70 atmospheres at room temperature. The whole is then heated while stirring to 130° C. and kept at this temperature until the pressure remains constant. When working up in the manner described in Example 1 55 grams of pure propanol are obtained.

Example 5

In the manner described in Example 1 a mixture of 202 grams of triethyl amine, 120 grams of pyridine, 600 grams of water, 161 grams of formic acid and 100 grams of iron carbonyl is treated at 130° C. with a mixture of equal parts of ethylene and carbon monoxide. From the reaction product about 30 grams of formic acid may be recovered. The reaction thus consumed 131 grams of formic acid. The propanol yield amounts to 160 grams.

Example 6

An autoclave of 5 litres capacity, after having been flushed with nitrogen, is charged with a mixture of 318 grams of N-butylpyrrolidine, 300 grams of finely ground ice, 150 grams of n-butanol, 140 grams of iron pentacarbonyl, and such an amount of formic acid that the mixture is brought to neutralization. A mixture of propylene and carbon monoxide (proportion by volume 1:2) under 40 atmospheres is pressed in. The reaction mixture is heated to 115° C. while stirring and a pressure of 80 atmospheres is maintained by continuously pressing on the said gas mixture until it is no longer absorbed. The reaction product is acidified with sulfuric acid and the butanol is distilled off azeotropically by means of water. The resulting distillate is dried with potassium carbonate and again distilled, giving 152 grams of butanol having a boiling point of 116 to 117° C. and, in addition, a small percentage of iso-butanol.

What we claim is:

1. A process for the production of aliphatic alcohols which comprises heating to temperatures exceeding 80° C. and under pressures exceeding 50 atmospheres in an aqueous from neutral to alkaline reaction medium an olefinic hydrocarbon with a soluble salt of formic acid as a source of carbon monoxide in the presence of iron carbonyl.

2. The process as set forth in claim 1, wherein the olefinic hydrocarbon is an aliphatic monoolefinic hydrocarbon.

3. The process as set forth in claim 1, wherein the olefinic hydrocarbon is an aliphatic monoolefinic hydrocarbon containing from 2 to 3 carbon atoms.

4. A process for the production of aliphatic alcohols which comprises heating to temperatures exceeding 80° C. and under pressures exceeding 50 atmospheres in an aqueous from neutral to alkaline reaction medium an aliphatic monoolefinic hydrocarbon with a tertiary amine salt of formic acid as a source of carbon monoxide in the presence of iron carbonyl.

5. A process for the production of aliphatic alcohols which comprises heating to temperatures exceeding 80° C. and under pressures exceeding 50 atmospheres in an aqueous from neutral to alkaline reaction medium an aliphatic monoolefinic hydrocarbon with a tertiary amine salt of formic acid as a source of carbon monoxide in the presence of iron carbonyl and an excess of a tertiary amine.

6. A process for the production of aliphatic alcohols which comprises heating to temperatures exceeding 80° C. and under pressures exceeding 50 atmospheres in an aqueous from neutral to alkaline reaction medium an aliphatic monoolefinic hydrocarbon with a tertiary amine salt of formic acid as a source of carbon monoxide and carbon monoxide in the presence of iron carbonyl and an excess of a tertiary amine.

7. A process for the production of aliphatic alcohols which comprises heating to temperatures between 100° and 200° C. and under a pressure between 100 and 300 atmospheres in an aqueous from neutral to alkaline medium a monoolefinic aliphatic hydrocarbon containing between 2 and 3 carbon atoms with at least an equimolecular amount of carbon monoxide and a tertiary amine salt of formic acid as a source of carbon monoxide in the presence of iron carbonyl.

8. A process for the production of aliphatic alcohols which comprises heating to temperatures between 100° and 200° C. and under a pressure between 100 and 300 atmospheres in an aqueous from neutral to alkaline medium a monoolefinic aliphatic hydrocarbon containing between 2 and 3 carbon atoms with at least an equimolecular amount of carbon monoxide and a tertiary amine salt of formic acid as a source of carbon monoxide in the presence of iron carbonyl and an excess of a tertiary amine.

9. The process as set forth in claim 8, wherein the tertiary amine salt is derived from a non-aromatic tertiary amine.

References Cited in the file of this patent

UNITED STATES PATENTS

| | | |
|---|---|---|
| 2,497,310 | Larson | Feb. 14, 1950 |
| 2,564,130 | Schreyer | Aug. 14, 1951 |

OTHER REFERENCES

Fieser and Fieser: "Organic Chemistry," pgs. 172 and 173. Publ. in 1944 by Heath and Co. Boston, Mass.

Ruhrchemic patent appl'n. R–655, in J. O. Reel 36, Item 21 and Part of Item 36, pgs. 12 and 13, March 12, 1946, available in translation PC-S-V of Meyer & Co.